(12) United States Patent
Miura et al.

(10) Patent No.: US 6,711,895 B1
(45) Date of Patent: Mar. 30, 2004

(54) ASSEMBLY OF A ONE-WAY CLUTCH AND A BEARING

(75) Inventors: Yoshihisa Miura, Osaka (JP); Katsumi Sekine, Nihonmatsu (JP)

(73) Assignees: Koyo Seiko Co., Ltd., Osaka-fu (JP); NOK Corporation, Tokyo (JP)

( * ) Notice: Subject to any disclaimer, the term of this patent is extended or adjusted under 35 U.S.C. 154(b) by 0 days.

(21) Appl. No.: 09/787,484
(22) PCT Filed: Jul. 18, 2000
(86) PCT No.: PCT/JP00/04826
§ 371 (c)(1), (2), (4) Date: Mar. 29, 2001
(87) PCT Pub. No.: WO01/06149
PCT Pub. Date: Jan. 25, 2001

(30) Foreign Application Priority Data

Jul. 19, 1999 (JP) ............................................. 11-204468

(51) Int. Cl.$^7$ ................................................ F16D 33/00
(52) U.S. Cl. ............... 60/345; 192/113.36; 192/113.22; 192/113.32; 192/70.12
(58) Field of Search ................ 192/3.21, 113.36, 192/113.34, 113.22, 70.12, 107 R, 113.32; 60/345, 346; 384/121, 123

(56) References Cited

U.S. PATENT DOCUMENTS

| | | | | |
|---|---|---|---|---|
| 3,972,400 A | * | 8/1976 | Howells | 192/107 R |
| 4,007,974 A | * | 2/1977 | Huber | 384/123 |
| 5,101,953 A | * | 4/1992 | Payvar | 192/107 R |
| 5,176,236 A | * | 1/1993 | Ghidorzi et al. | 192/107 R |
| 5,566,802 A | * | 10/1996 | Kirkwood | 192/3.29 |
| 5,671,835 A | * | 9/1997 | Tanaka et al. | 192/107 R |
| 5,680,758 A | * | 10/1997 | Miura | 60/345 |
| 5,682,971 A | * | 11/1997 | Takakura et al. | 192/107 R |
| 5,975,260 A | * | 11/1999 | Fischer et al. | 192/3.29 |
| 6,293,382 B1 | * | 9/2001 | Nishide et al. | 192/107 R |

FOREIGN PATENT DOCUMENTS

| | | |
|---|---|---|
| JP | 61-99717 | 5/1986 |
| JP | 6-117432 | 4/1994 |
| JP | 7-28219 | 5/1995 |
| JP | 8-247251 | 9/1996 |
| JP | 10-122334 | 5/1998 |
| JP | 10-281141 | 10/1998 |

* cited by examiner

Primary Examiner—Jack W. Lavinder
Assistant Examiner—Mariano Sy
(74) Attorney, Agent, or Firm—Jordan and Hamburg LLP

(57) ABSTRACT

An assembly of a one-way clutch and a bearing in which a thrust load due to a stator is absorbed and a dynamic pressure is generated is configured to prevent an abrupt temperature rise even when the pressure becomes high so that wear of sliding faces is prevented. The assembly of the one-way clutch and bearing is attached a stator of a torque converter. Dynamic pressure grooves and an escape groove serving as the bearings are formed in at least one of opposing faces of a flange portion formed on the stator and a pump member, or opposing faces of a bearing support which is placed on the side opposite to the flange portion of the stator, and a turbine member.

3 Claims, 8 Drawing Sheets

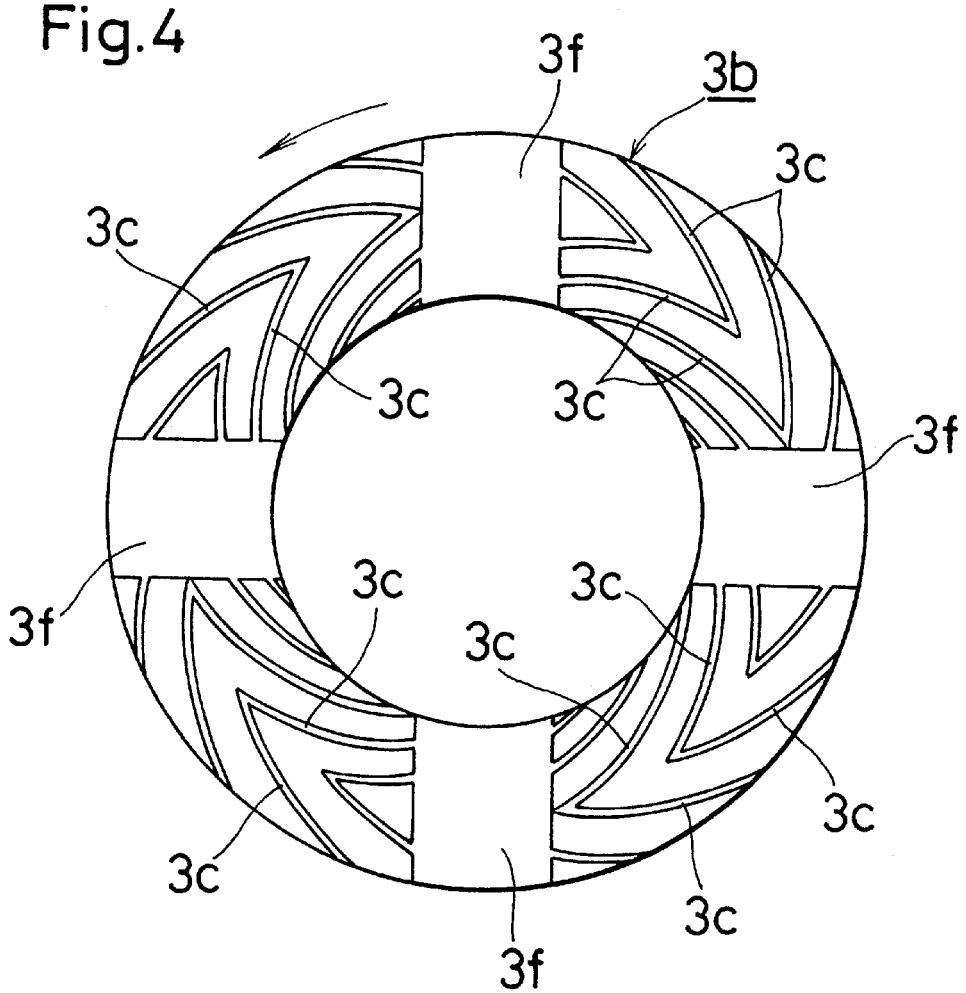

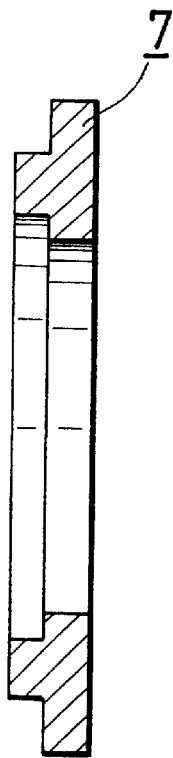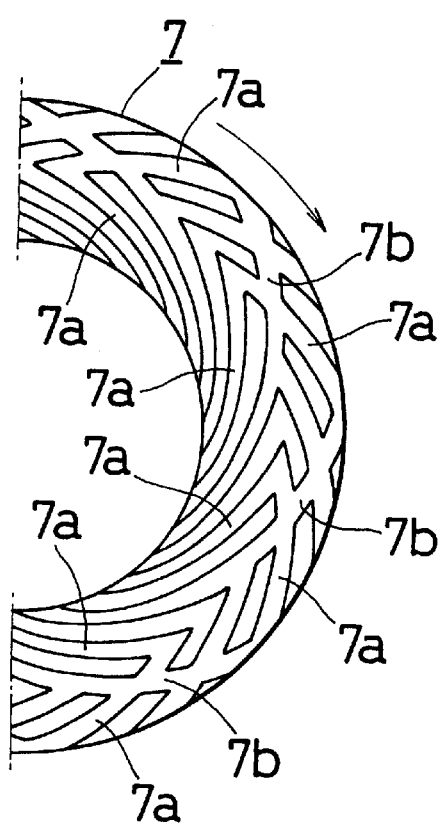

ASSEMBLY OF A ONE-WAY CLUTCH AND A BEARING

TECHNICAL FIELD

The present invention relates to an assembly of a one-way clutch and a bearing which is to be attached to a stator of a torque converter, and more particularly to an assembly of a one-way clutch and a bearing in which a thrust bearing (needle bearing), a thrust washer, and the like are not used, and wear of sliding faces of a stator and a bearing support can be reduced.

BACKGROUND ART

A torque converter which is used as an automatic transmission of an automobile is configured so that, as shown in FIG. 9, a pump impeller 2 is rotated by an output shaft 1 of an engine, a turbine runner 4 is rotated by using ATF (Automatic Transmission Fluid), the rotational torque of the turbine runner 4 is increased via a stator 3, and the power is then transmitted to an input shaft 5 of the transmission. A one-way clutch 6 is attached to the stator 3. An inner race 6b of the one-way clutch 6 is non-rotatably placed by spline fitting or the like on a stationary shaft 11 which is placed around the input shaft 5. Depending on the vane angle of the stator a thrust load is applied to the one-way clutch 6. In order to absorb the load, therefore, thrust bearings 12 and 13 (or thrust washers) are usually placed on both the sides of the one-way clutch 6, respectively.

When the thrust bearings 12 and 13 (or thrust washers) are placed on both the sides of the one-way clutch 6, however, the number of parts is increased, the configuration is complicated, and it is disadvantageous from the view point of space. Consequently, the assignee of the present application has proposed an assembly of a one-way clutch and a bearing in which, as shown in FIG. 6, such a thrust bearing 12 and the like are not used, small gaps 21 and 20 are respectively formed between a flange portion 3b, that elongates radially inward from a boss portion 3a of the stator 3, and a pump-side member 2a. A bearing support 7 and a turbine-side member 4a are placed on the opposite side, and dynamic pressure grooves are formed in sliding faces of the flange portion 3b of the stator 3 and the bearing support 7 (Japanese Patent Publication (Kokai) No. HEI8-247251).

As shown in FIGS. 7(A) and 7(B), for example, herringbone-like or V-like dynamic pressure grooves 10, 10, ... are formed in the surface of the side face of the flange portion 3b of the stator 3, or, as shown in FIGS. 8(A) and 8(B), herringbone-like or V-like dynamic pressure grooves 9, 9, ... are formed in the surface of the side face of the bearing support 7. A dynamic pressure is generated by relative rotation of the stator 3 and the like, so that the thrust load is supported and thrust bearings or thrust washers are not required.

The stator 3 and the bearing support 7, in which the herringbone-like or V-like dynamic pressure grooves 10 or 9 are formed in the sliding face, are produced from a synthetic resin. The ATF (Automatic Transmission Fluid) which generates a dynamic pressure is sucked into the dynamic pressure grooves 10 (9) from the inner and outer radial sides of the side faces of the stator 3 and the bearing support 7 to join together in the apexes of the dynamic pressure grooves 10 (9), i.e., in the center of the sliding faces, with the result that the pressure is raised to exert the dynamic pressure effect. In such pressure rise, however, the pressure is generated at the junctions of the dynamic pressure grooves 10 (9), but the high-pressure fluid has no way of escape, and hence the fluid temperature is abruptly raised in accordance with the sliding operation of the side faces of the stator 3 and the bearing support 7. As a result, there arises a problem in that the sliding faces are easily worn.

SUMMARY OF THE INVENTION

The invention has been conducted in view of the above-discussed problem. It is an object of the invention to provide an assembly of a one-way clutch and a bearing in which a thrust load due to a stator can be absorbed, a dynamic pressure can be generated, and, even when the pressure becomes high, the temperature is prevented from being abruptly raised, so that wear and the like of sliding faces can be prevented from occurring.

In order to solve the problem, the present invention provides an assembly of a one-way clutch and a bearing in which a bearing is placed between a one-way clutch attached to a stator of a torque converter, and a pump member adjacent to a flange portion formed on the stator, and a turbine member adjacent to a bearing support which is placed on a side opposite to the flange portion of the stator, and dynamic pressure grooves (3c) and an escape groove(s) (3d) serving as the bearings are formed in at least one of opposing faces of the flange portion formed on the stator and the pump member, or opposing faces of the bearing support which is placed on the side opposite to the flange portion of the stator, and the turbine member.

Furthermore, the present invention provides that the escape groove(s) is a ring-like groove (3e) which is formed in a circumferential direction of a face, the dynamic pressure grooves being formed in the face.

Moreover, the present invention also provides that the escape grooves are grooves (3f) which are radially formed at predetermined angular intervals in a circumferential direction of a face, the dynamic pressure grooves being formed in the face whereat the dynamic pressure grooves are not formed.

Furthermore, the present invention additionally provides that a bearing support is placed in place of the flange portion of the stator.

Moreover, the present invention provides that the bearing support is used as the flange portion of the stator, and the flange portion of the stator is used as the bearing support.

BRIEF DESCRIPTION OF DRAWINGS

FIG. 4 is a view showing an example which is a third embodiment of the assembly of a one-way clutch and a bearing of the present invention wherein dynamic pressure grooves are formed in a side face of a flange portion of a stator, and grooves which interrupt the dynamic pressure grooves are radially formed as escape grooves at predetermined angular intervals in a circumferential direction.

FIG. 5(A) is a section view of a bearing support constituting the assembly of a one-way clutch and a bearing of the present invention, and FIG. 5(B) is a side view of the bearing support.

DETAILED DESCRIPTION

Figure 1:
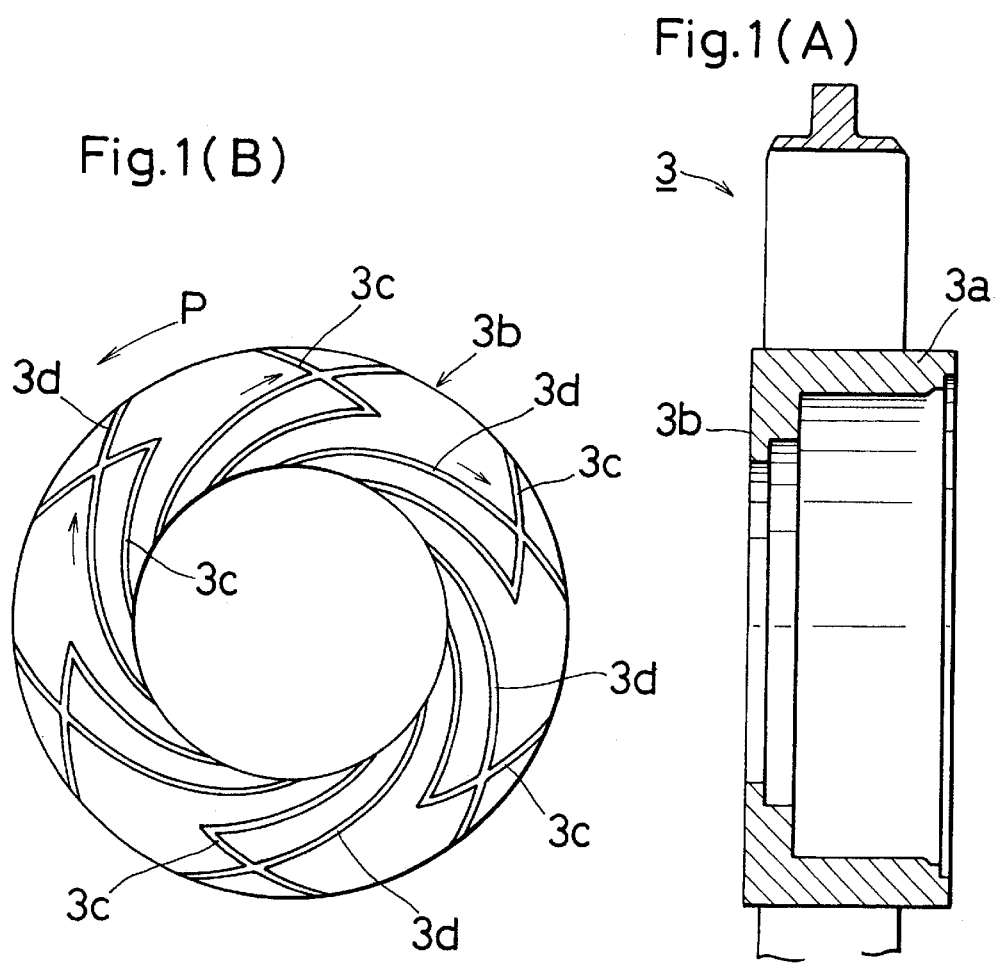
FIG. 1(A) is an axial section view of a stator constituting an assembly of a one-way clutch and a bearing of the present invention.
FIG. 1(B) is a side view of a flange portion.

Hereinafter, specific embodiments of the invention will be described with reference to the drawings. In the following, description will be made referring to FIG. 6 in order to avoid duplicated description, and the same components will be described by using the identical reference numerals.

FIG. 1(A) is an axial section view of a stator 3 constituting the assembly of a one-way clutch and a bearing of the invention, and FIG. 1(B) is a side view of a flange portion of FIG. 1(A). The stator 3 is configured in the same manner as the stator shown in FIG. 6, and formed by a boss portion 3a, and a flange portion 3b formed by elongating radially inward one side of the boss portion 3a.

An outer race 6a (see FIG. 6) of the one-way clutch is fitted into the inner side of the boss portion 3a. The pumpside member 2a (see FIG. 6) is placed on the side adjacent and opposed to the flange portion 3b of the stator 3 to form a small gap 21 therebetween. A one-way clutch is placed and the bearing support 7 is placed on the side of the boss portion 3a opposite to the flange portion 3b. The turbine-side member 4a (see FIG. 6) is placed on the side adjacent and opposed to the bearing support 7 and forms a small gap 20 therebetween.

As shown in FIG. 1(B), herringbone-like or V-like dynamic pressure grooves 3c, 3c, . . . are formed in the side face of the flange portion 3b of the stator 3 at predetermined intervals in a circumferential direction. The dynamic pressure grooves 3c, 3c, . . . are formed so that the resistance of the automatic transmission fluid with respect to the relative rotation direction of the stator 3, indicated by the arrow P, is increased. Namely, the dynamic pressure grooves 3c, 3c, . . . are formed so that, during relative rotation of the stator 3, the automatic transmission fluid is introduced from the inner and outer radial sides and joins in a rear center portion in the rotation direction of the stator 3. The dynamic pressure grooves 3c are not limited to a herringbone-like shape or a V-like shape, and may have any other shape such as a triangular shape as long as a dynamic pressure can be generated. During relative rotation of the stator 3, a high pressure is generated in the gap 21 between the stator and the pumpside member 2a, and hence such dynamic pressure grooves 3c, 3c, . . . have a function of a bearing. Therefore, a thrust bearing or a thrust washer which is necessary in the conventional art is not required.

In the side face of the flange portion 3b of the stator 3, the dynamic pressure grooves 3c, 3c, . . . are formed, and also escape grooves 3d, 3d, . . . for allowing the automatic transmission fluid to escape are formed. In order to allow the automatic transmission fluid to smoothly escape by using a centrifugal force generated during relative rotation of the stator 3, each of the escape grooves 3d is formed into a curved shape such as that constituting a part of a volution (spiral) so that the inner radial side is in the forward side and the outer radial side is in the rearward side. When the escape grooves 3d, 3d, . . . are formed together with the dynamic pressure grooves 3c, 3c, . . . in the side face of the flange portion 3b of the stator 3 in this way, the dynamic pressure generated in the center of the side face of the flange portion 3b can be allowed to escape at a certain degree. Therefore, abrupt generation of a high pressure and temperature rise of the automatic transmission fluid which are caused by the rotation can be suppressed.

Figure 2:
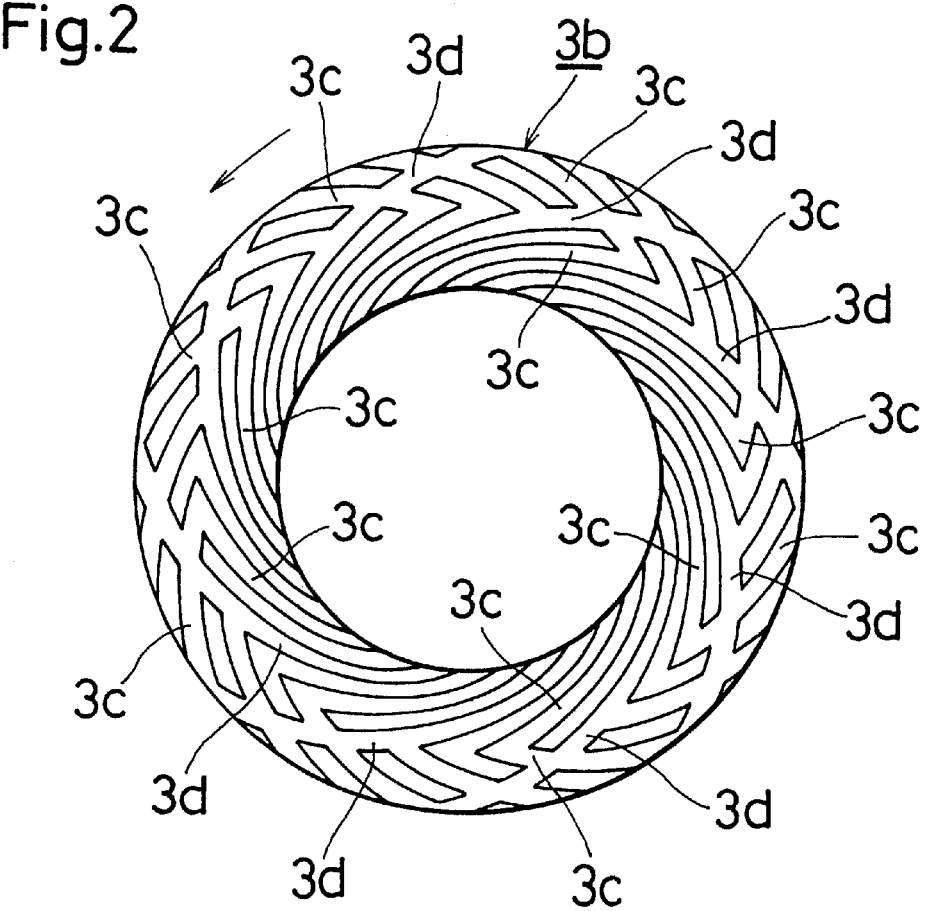
FIG. 2 is a side view of a flange portion of a stator constituting an assembly of a one-way clutch and a bearing of the present invention, and showing an embodiment in which dynamic pressure grooves and escape grooves are densely formed.

FIG. 2 is a side view of the flange portion 3b of the stator 3 in which wide dynamic pressure grooves 3c, 3c, are densely formed in the side face. Also in the surface of the flange portion 3b in which the dynamic pressure grooves 3c are formed, volute (spiral) escape grooves 3d are formed so that the inner radial side is in the forward side with respect to the relative rotation of the stator 3 and the outer radial side is in the rearward side, and that the automatic transmission fluid is allowed to escape by using a centrifugal force.

Figure 3:
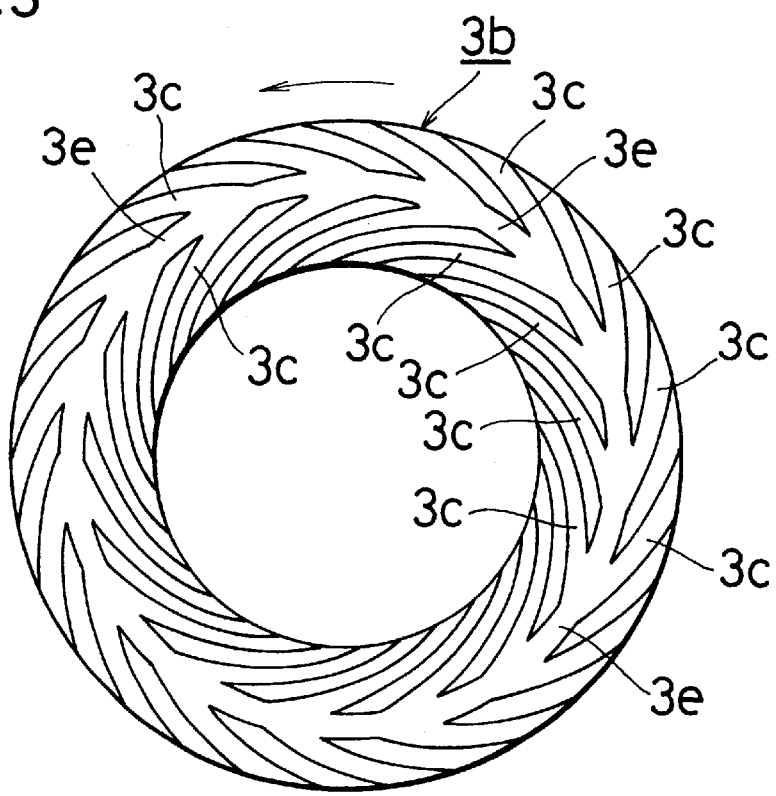
FIG. 3 is a view showing an example which is a second embodiment of the assembly of a one-way clutch and a bearing of the present invention wherein dynamic pressure grooves formed in a side face of a flange portion of a stator, and a ring-like escape groove that elongates in a circumferential direction in junction points of the dynamic pressure grooves is formed.
Figure 6:
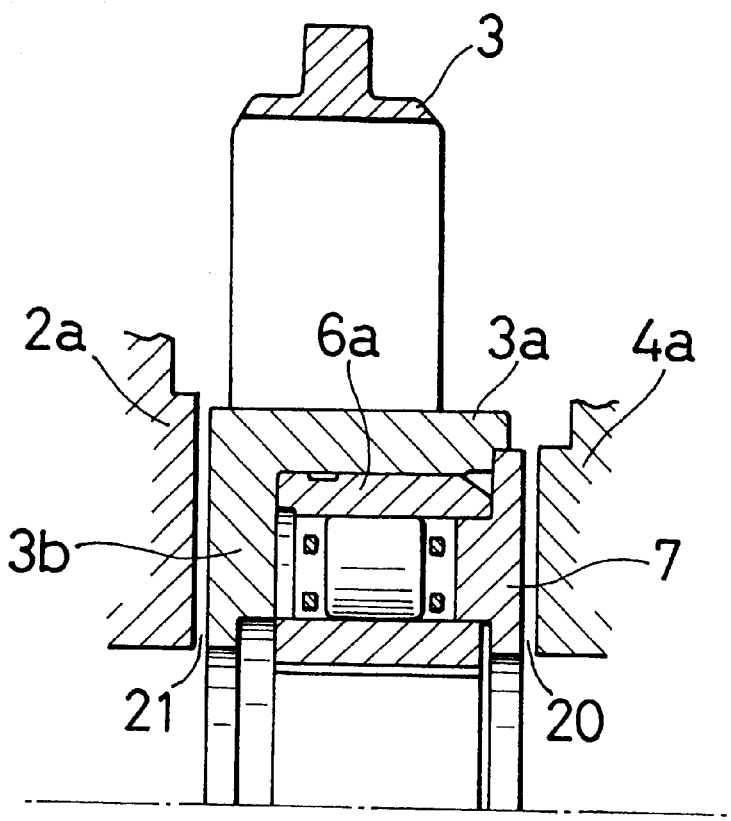
FIG. 6 is an axial section view of an assembly of a one-way clutch and a bearing of the conventional art showing an axial section of an assembly of a one-way clutch and a bearing in which a thrust bearing and a thrust washer are not used.
Figure 7B:
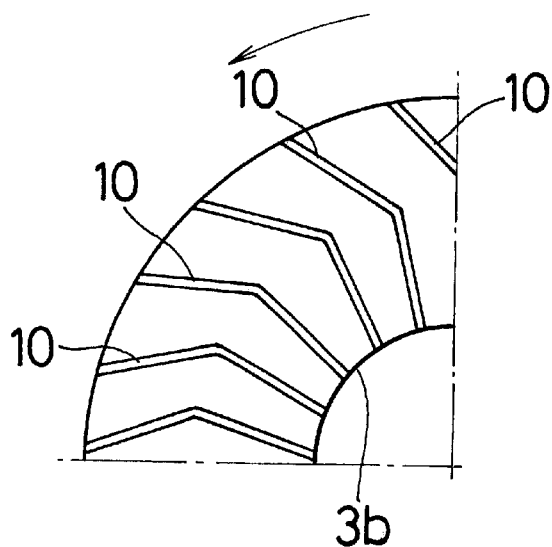
FIG. 7(B) is a side view of the stator.
Figure 7A:
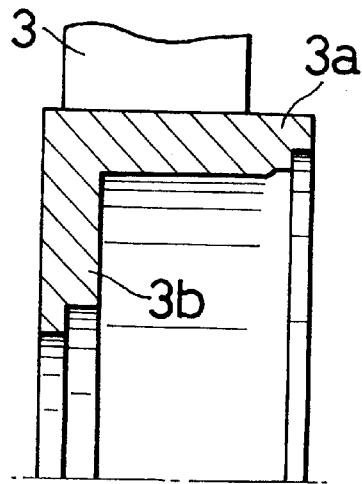
FIG. 7(A) is a partial axial section view of a stator constituting an assembly of a one-way clutch and a bearing of the conventional art.
Figure 8A:
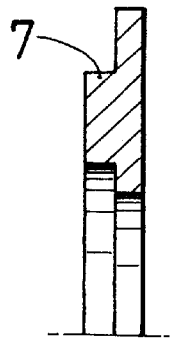
FIG. 8(A) is a partial axial section view of a bearing support which is placed in a stator constituting an assembly of a one-way clutch and a bearing of the conventional art.
Figure 8B:
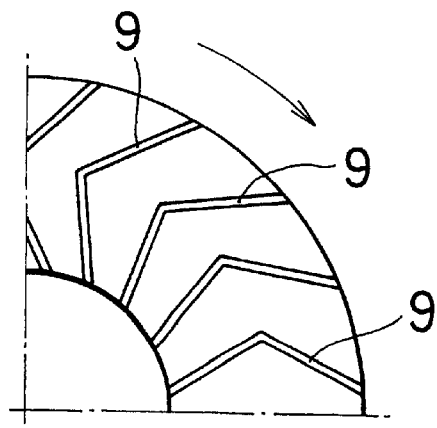
FIG. 8(B) is a side view of the bearing support.
Figure 9:
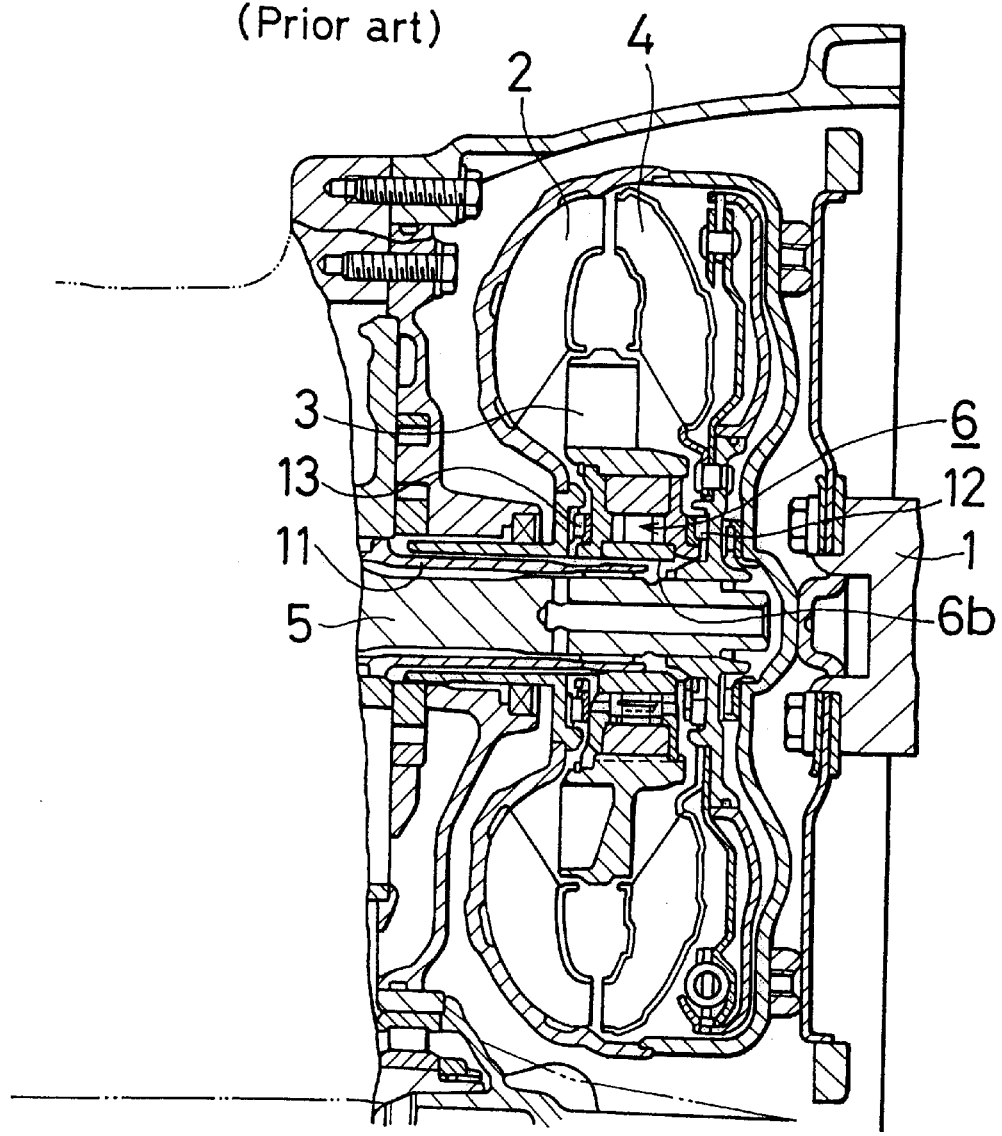
FIG. 9 is an axial section view of an assembly of a one-way clutch and a bearing of the conventional art in which a thrust bearing and a thrust washer are placed on both the sides of a stator wherein the one-way clutch is disposed.

Next, FIG. 3 is a side view of the stator 3 of a second embodiment constituting the assembly of a one-way clutch and a bearing of the present invention. In the stator 3, a ring-like circular escape groove 3e having a predetermined width is formed in a circumferential direction in junction points of the dynamic pressure grooves 3c, 3c, . . . which are formed in the side face. Namely, the conventional dynamic pressure grooves 10, 10, . . . such as shown in FIG. 6 cannot allow a dynamic pressure generated in the center of each groove to escape. By contrast, in the embodiment, between the center circular escape groove 3e and the outer portion of each of the dynamic pressure grooves 3c that are positioned more outward than the escape groove, paths are formed so as to connect the grooves. Therefore, the circular groove 3e functions as an escape groove, so that the high pressure of the automatic transmission fluid which is generated in the center portions of the dynamic pressure grooves 3c, 3c, . . . can be allowed to escape to the outside of the stator 3 by a centrifugal force due to the relative rotation.

FIG. 4 is a side view of the stator 3 of a third embodiment of the present invention.

In the embodiment, the dynamic pressure grooves 3c, 3c, . . . are formed in the side face of the flange portion 3b of the stator 3, and radial grooves 3f, 3f, . . . are radially formed at predetermined angular intervals in a circumferential direction. The radial grooves serve as escape grooves which interrupt the dynamic pressure grooves 3c, 3c, . . . in four places (at an interval of 90 deg.) in the circumferential direction where at the dynamic pressure grooves are not formed. The dynamic pressure of the automatic transmission fluid which is generated by the relative rotation of the stator 3 can be allowed to escape to the outside of the stator 3 through the radial grooves 3f, 3f, . . . . The radial grooves 3f, 3f, . . . which interrupt the dynamic pressure grooves 3c may be formed with reducing their width, and radially increased or reduced.

In the assembly of a one-way clutch and a bearing of the invention, the stator 3 has been exemplarily described. As shown in FIGS. 5(A) and 5(B), alternatively, also in a side face of the bearing support 7, dynamic pressure grooves 7a may be similarly formed and escape grooves 7b may be formed, or a circular groove or radial grooves which are similar to the ring groove 3e or the radial grooves 3f may be formed.

In addition to the above-described embodiments, dynamic pressure grooves and escape grooves may be formed also in the surface of the pump-side member 2a which is placed to form the small gap 21 with respect to the flange portion 3b of the stator 3, and in that of the turbine-side member 4a which is placed to form the small gap 21 with respect to the bearing support 7. In the stator 3, the flange portion 3b may not be formed, and a bearing support may be placed. Conversely, a flange portion may be placed on the side of the bearing support 7 of FIG. 1, the flange portion 3b may be placed on the side of the pump-side member 2a of the stator 3, and dynamic pressure grooves and—escape grooves may be formed in the surfaces of the portions.

In the above-described embodiments, the dynamic pressure grooves 3c (7a), the escape grooves 3d (7b), and the like are formed in the side face of the flange portion 3b of the stator 3, and the bearing support 7. Alternatively, the dynamic pressure grooves 3c and the escape grooves 3d (3e, 3f) may be formed in the flange portion 3b of the stator for 3, and a thrust bearing or a washer may be placed between the bearing support 7 and the turbine-side member 4a. Alternatively, the dynamic pressure grooves 7a and the escape grooves 7b may be formed in the side face of the bearing support 7, and a thrust washer or a needle bearing may be placed on the side of the flange portion 3b of the stator 3.

As described above in detail, according to the assembly of a one-way clutch and a bearing of the present invention, the automatic transmission fluid of elevated temperature can be discharged while maintaining an adequate dynamic pressure between the stator and a pump member, and the stator and a turbine member. Furthermore, cold automatic transmission fluid is sucked from the dynamic grooves to the sliding faces of the stator and the bearing support to exert the dynamic pressure effect, and the automatic transmission fluid of elevated temperature is discharged from the escape grooves. Therefore, also wear of the sliding faces can be reduced.

What is claimed is:

1. An assembly of a one-way clutch attached to a stator of a torque converter, a pump member, a turbine member, and a bearing support, comprising:

said stator having a stator flange portion disposed adjacent said pump member and defining a first gap therebetween;

said bearing support being disposed on a side of the one-way clutch opposite that of said stator flange portion and being disposed adjacent said turbine member to define a second gap therebetween; and dynamic pressure grooves and escape grooves, serving to function as hydraulic bearings, being formed in at least one of:

at least one annular face, having an inner circumference and an outer circumference, of opposing faces of said stator flange portion and said pump member; and at least one annular face, having an inner circumference and an outer circumference, of opposing faces of said bearing support and said turbine member;

wherein said escape grooves include grooves radially-formed at predetermined angular intervals in a circumferential direction of said at least one annular face and extending from the outer circumference to the inner circumference of said at least one annular face, and said dynamic pressure grooves are formed in said at least one annular face except where said escape grooves are formed and each said dynamic pressure groove has two open ends, at least one of said open ends communicating with said escape groove and other said open ends communicating with exterior of the inner circumference or exterior of the outer circumference of said at least one annular face.

2. The assembly according to claim 1, wherein said stator flange portion is formed as a bearing support.

3. The assembly according claim 1, wherein said bearing support is said stator flange portion of said stator, and said stator flange portion of said stator is said bearing support.

* * * * *